United States Patent [19]
Beck et al.

[11] Patent Number: 5,145,816
[45] Date of Patent: * Sep. 8, 1992

[54] METHOD FOR FUNCTIONALIZING SYNTHETIC MESOPOROUS CRYSTALLINE MATERIAL

[75] Inventors: Jeffrey S. Beck, Princeton; David C. Calabro, Somerset; Sharon B. McCullen, Newtown; Bruce P. Pelrine, Trenton; Kirk D. Schmitt, Pennington, all of N.J.; James C. Vartuli, West Chester, Pa.

[73] Assignee: Mobil Oil Corporation, Fairfax, Va.

[ * ] Notice: The portion of the term of this patent subsequent to Apr. 17, 2009 has been disclaimed.

[21] Appl. No.: 718,056

[22] Filed: Jun. 20, 1991

Related U.S. Application Data

[63] Continuation-in-part of Ser. No. 625,245, Dec. 10, 1990, Pat. No. 5,098,684, which is a continuation-in-part of Ser. No. 470,008, Jan. 19, 1990, which is a continuation-in-part of Ser. No. 625,171, Dec. 10, 1990, Pat. No. 5,057,296.

[51] Int. Cl.$^5$ ............................................. B01J 29/04
[52] U.S. Cl. ........................................ 502/60; 502/64; 502/77
[58] Field of Search ............... 423/326, 328, 329, 330, 423/331, 332, 118, 277; 502/60, 64, 77

[56] References Cited

U.S. PATENT DOCUMENTS

| | | | |
|---|---|---|---|
| 3,725,302 | 4/1973 | Shimely et al. | 502/62 |
| 4,091,079 | 5/1978 | Vaughan | 423/328 |
| 4,257,916 | 3/1981 | Hancock et al. | 502/60 |
| 4,390,414 | 6/1983 | Cody | 208/111 |
| 4,439,409 | 3/1984 | Puppe et al. | 423/328 |
| 4,954,325 | 9/1990 | Rubin et al. | 502/64 |

FOREIGN PATENT DOCUMENTS 63-230516 9/1988 Japan .................... 423/328

OTHER PUBLICATIONS

J. M. Rojo, et al., "Si MAS-NMR Spectra of Lamellar Silicic Acid H-magadiite and its Trimethylsilyl Derivative", Z. anorg, allg, Chem. 540/541, 227-233 (1986).

W. E. Rudzinski, et al., "Synthesis, Solid-State Nuclear Magnetic Resonance Characterization and Chromatographic Evaluation of Diphenylphosphine-Octadecyesilane Hybrid Bonded Phase", Journal of Chromatography 323, 281-296 (1985).

C. A. Fyfe, et al., "Quantitatively Reliable Silicon-29 Magic-Angle Spinning Nuclear Magnetic Resonance Spectra of Surfaces and Surface-Immobilized Species at High Field Using a Conventional High-Resolution Spectrometer:", J. Phys. Chem. 89, 277-281 (1985).

D. W. Sindorf, et al., "Silicon-29 Neclear Magnetic Resonance Study of Hydroxyl Sites on Dehydrated Silica Gel Surfaces, Using Silylation as a Probe", J. Phys.Chem. 87, 5516-5521 (1983).

D. W. Sindorf et al., "Cross-Polarization/Magic-Angle Spinning Silicon-29 Nuclear Magnetic Resonance Study of Silica Gel Using Trimethylsilane Bonding as a Probe of Surface Geometry and Reactivity", J. Phys. Chem. 86, 5208-5219 (1982).

H. Colin, et al., "Introduction to Reversed-Phase High Performance Liquid Chromatography", Journal of Chromatography 141, 289-312 (1977).

J. B. Peri et al., "The Surface Structure of Silica Gel", J. Phys. Chem. 72, 2926-2933 (1968).

*Primary Examiner*—R. Bruce Breneman
*Attorney, Agent, or Firm*—Alexander J. McKillop; Charles J. Speciale; Dennis P. Santini

[57] ABSTRACT

A method is described for modifying an ultra-large pore crystalline material by contacting with a treatment composition M'X'Y'$_n$ wherein M' is an element of Groups IIA, IVA, VA, VIA, VIIA, IB, IIB, IVB, VB or VIB; X' is halide, hydride, alkoxide of $C_{1-6'}$, or acetate; Y' is X or phosphine, sulfide, carbonyl or cyano; and N=1-5. The contacted crystalline material becomes functionalized. The functionalized material is also described and can be used as a sorbent or catalyst component.

20 Claims, No Drawings

METHOD FOR FUNCTIONALIZING SYNTHETIC MESOPOROUS CRYSTALLINE MATERIAL

CROSS-REFERENCE TO RELATED APPLICATIONS

This application is a continuation-in-part of U.S. patent application Ser. No. 625,245 filed Dec. 10, 1990, now U.S. Pat. No. 5,098,684 which was a continuation-in-part of application Ser. No. 470,008, filed Jan. 25, 1990, which is a continuation-in-part of U.S. patent application Ser. No. 625,171 filed Dec. 10, 1990, now U.S. Pat. No. 5,057,296.

BACKGROUND OF THE INVENTION

1. Field of the Invention

This invention relates to a method for modifying a novel composition of synthetic ultra-large pore crystalline material by incorporating functional groups into the crystalline material.

2. Description of the Prior Art

Porous inorganic solids have found great utility as catalysts and separations media for industrial application. The openness of their microstructure allows molecules access to the relatively large surface areas of these materials that enhance their catalytic and sorptive activity. The porous materials in use today can be sorted into three broad categories using the details of their microstructure as a basis for classification. These categories are the amorphous and paracrystalline supports, the crystalline molecular sieves and modified layered materials. The detailed differences in the microstructures of these materials manifest themselves as important differences in the catalytic and sorptive behavior of the materials, as well as in differences in various observable properties used to characterize them, such as their surface area, the sizes of pores and the variability in those sizes, the presence or absence of X-ray diffraction patterns and the details in such patterns, and the appearance of the materials when their microstructure is studied by transmission electron microscopy and electron diffraction methods.

Amorphous and paracrystalline materials represent an important class of porous inorganic solids that have been used for many years in industrial applications. Typical examples of these materials are the amorphous silicas commonly used in catalyst formulations and the paracrystalline transitional aluminas used as solid acid catalysts and petroleum reforming catalyst supports. The term "amorphous" is used here to indicate a material with no long range order and can be somewhat misleading, since almost all materials are ordered to some degree, at least on the local scale. An alternate term that has been used to described these materials is "X-ray indifferent". The microstructure of the silicas consists of 100-250 Angstrom particles of dense amorphous silica (*Kirk-Othmer Encyclopedia of Chemical Technology*, 3rd Edition, Vol. 20, John Wiley & Sons, New York, p. 766–781, 1982), with the porosity resulting from voids between the particles. Since there is no long range order in these materials, the pore sizes tend to be distributed over a rather large range. This lack of order also manifests itself in the X-ray diffraction pattern, which is usually featureless.

Paracrystalline materials such as the transitional aluminas also have a wide distribution of pore sizes, but better defined X-ray diffraction patterns usually consisting of a few broad peaks. The microstructure of these materials consists of tiny crystalline regions of condensed alumina phases and the porosity of the materials results from irregular voids between these regions (K. Wefers and Chanakya Misra, "Oxides and Hydroxides of Aluminum", Technical Paper No. 19 Revised, Alcoa Research Laboratories, p. 54–59, 1987). Since, in the case of either material, there is no long range order controlling the sizes of pores in the material, the variability in pore size is typically quite high. The sizes of pores in these materials fall into a regime called the mesoporous range, which, for the purposes of this application, is from about 13 to 200 Angstroms.

In sharp contrast to these structurally ill-defined solids are materials whose pore size distribution is very narrow because it is controlled by the precisely repeating crystalline nature of the materials, microstructure. These materials are called "molecular sieves", the most important examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolite material. Since the dimensions of these pores are such as to accept for adsorption molecules of certain dimensions while rejecting those of larger dimensions, these materials are known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIB element oxide, e.g. $AlO_4$, in which the tetrahedra are cross-linked by the sharing of oxygen atoms whereby the ratio of the total Group IIIB element, e.g. aluminum, and Group IVB element, e.g. silicon, atoms to oxygen atoms is 1:2. The electrovalence of the tetrahedra containing the Group IIIB element, e.g. aluminum, is balanced by the inclusion in the crystal of a cation, for example, an alkali metal or an alkaline earth metal cation. This can be expressed wherein the ratio of the Group IIIB element, e.g. aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat. No. 3,972,983); ZSM-35 (U.S. Pat. No. 4,016,245); and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724; 4,073,865 and 4,104,294 describe crystalline silicate of varying alumina and metal content.

Aluminum phosphates are taught in the U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous or transforms, is the "$H_1$" phase or hydrate of aluminum phosphate of F.d,Yvoire, *Memoir Presented to the Chemical Society*, No. 392, "Study of Aluminum Phosphate and Trivalent Iron", July 6, 1961 (received), pp. 1762-1776. This material, when crystalline, is identified by the JCPDS International Center for Diffraction Data card number 15-274. Once heated at about 110° C., however, the d,Yvoire material becomes amorphous or transforms to the aluminophosphate form of tridymite.

Compositions comprising crystals having a framework topology after heating at 110° C. or higher giving an X-ray diffraction pattern consistent with a material having pore windows formed by 18 tetrahedral members of about 12-13 Angstroms in diameter are taught in U.S. Pat. No. 4,880,611.

A naturally occurring, highly hydrated basic ferric oxyphosphate mineral, cacoxenite, is reported by Moore and Shen, *Nature*, Vol. 306, No. 5941, pp. 356-358 (1983) to have a framework structure containing very large channels with a calculated free pore diameter of 14.2 Angstroms. R. Szostak et al., *Zeolites: Facts, Figures, Future*, Elsevier Science Publishers B.V., 1989, present work showing cacoxenite as being very hydrophilic, i.e. adsorbing non-polar hydrocarbons only with great difficulty. Their work also shows that thermal treatment of cacoxenite causes an overall decline in X-ray peak intensity.

Silicoaluminophosphates of various structures are taught in U.S. Pat. No. 4,440,871. Aluminosilicates containing phosphorous, i.e. silicoaluminophosphates of particular structures are taught in U.S. Pat. Nos. 3,355,246 (i.e. ZK-21) and 3,791,964 (i.e. ZK-22) Other teachings of silicoaluminophosphates and their synthesis include U.S. Pat. Nos. 4,673,559 (two-phase synthesis method); 4,623,527 (MCM10); 4,639,358 (MCM-1); 4,647,442 (MCM-2); 4,664,897 (MCM-4); 4,638,357 (MCM-5); and 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Pat. Nos. 911,416; 911,417; and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550; and 3,697,550.

The precise crystalline microstructure of most zeolites manifests itself in a well-defined X-ray diffraction pattern that usually contains many sharp maxima and that serves to uniquely define the material. Similarly, the dimensions of pores in these materials are very regular, due to the precise repetition of the crystalline microstructure. All molecular sieves discovered to date have pore sizes in the microporous range, which is usually quoted as 2 to 20 Angstroms, with the largest reported being about 12 Angstroms.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, trititanates and perovskites. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and the pillared products include U.S. Pat. Nos. 4,216,188; 4,248,739; 4,176,090; and 4,367,163; and European Patent Application 205,711.

The X-ray diffraction patterns of pillared layered materials can vary considerably, depending on the degree that swelling and pillaring disrupt the otherwise usually well-ordered layered microstructure. The regularity of the microstructure in some pillared layered materials is so badly disrupted that only one peak in the low angle region on the X-ray diffraction pattern is observed, at a d-spacing corresponding to the interlayer repeat in the pillared material. Less disrupted materials may show several peaks in this region that are generally orders of this fundamental repeat. X-ray reflections from the crystalline structure of the layers are also sometimes observed. The pore size distribution in these pillared layered materials is narrower than those in amorphous and paracrystalline materials but broader than that in crystalline framework materials.

Various porous inorganic solids have been subjected to ion exchange, impregnation, codeposition, adsorption, introduction of compounds during crystallization and adsorption of metal vapor to introduoe catalYtioally active components into their pore cavities or onto their surfaces. Functionalization as in the present invention differs in kind from these treatment processes.

Various methods have also been used to derivatize or add functional groups to the interior of the pores or to the exterior surfaces of previously known porous inorganic solids, such as the amorphous silicas or the crystalline zeolites.

The hydrolysis of alkyl compounds to generate functional groups has been described, for example, in U.S. Pat. No. 4,390,414. In U.S. Patent No. 4,390,414, a zeolite is modified by first treating the zeolite to remove organic templating ions, calcining, cation exchanging or increasing $SiO_2/Al_2O_3$ ratio to generate isolated reactive sites, then contacting with organosilanes for silylation. Only isolated silanol hydroxyl groups or strained bridge sites can be reacted, therefore the percentage of modified sites in the zeolite is low. In addition, careful pre-modification preparation of the zeolite and anhydrous conditions are necessary.

Amorphous silicas have been derivatized by silylation. W. E. Rudzinski, et al., "Synthesis, Solid-State Nuclear Magnetic Resonance Characterization and Chromatographic Evaluation of a Diphenylphosphine-Octadecylsilane Hybrid Bonded Phase", Journal of Chromatography 323, 281–296 (1985) describes the derivatization of silica gel. See also C. A. Fyfe, et al., "Quantitatively Reliable Silicon-29 Magic-Angle Spinning Nuclear Magnetic Resonance Spectra of Surfaces and Surface-Immobilized Species at High Field Using a Conventional High-Resolution Spectrometer", J. Phys. Chem. 89, 277–281 (1985); D. W. Sindorf, et al., "Silicon-29 Nuclear Magnetic Resonance Study of Hydroxyl Sites on Dehydrated Silica Gel Surfaces, Using Silylation as a Probe", J. Phys. Chem. 87, 5516–5521 (1983); D. W. Sindorf et al., "Cross-Polarization/Magic-Angle Spinning Silicon-29 Nuclear Magnetic Resonance Study of Silica Gel Using Trimethylsilane Bonding as a Probe of Surface Geometry and Reactivity", J. Phys. Chem. 86, 5208–5219 (1982); H. Colin, et al., "Introduction to Reversed-Phase High Performance Liquid Chromatography", Journal of Chromatography 141, 289–312 (1977); J. B. Peri et al., "The Surface Structure of Silica Gel", J. Phys. Chem. 72, 2926–2933 (1968).

Layered silicates have also been derivatized. J. M. Rojo, et al., "Si MAS-NMR Spectra of Lamellar Silicic Acid H-magadiite and its Trimethylsilyl Derivative", Z. anorg. allg. Chem. 540/541, 227–233 (1986) reported that although magadiite contains 37% of its silicons as silanols, (6.2 meq/g), no more than 30% of these silanol sites reacted with hexamethyldisilazane, even when the magadiite was swelled with an organic.

As described above in this background discussion, the differences in microstructures of porous inorganic solids e.g. materials such as amorphous silica, layered materials and zeolites, result in important differences in the chemistry of these materials. Therefore, it is not possible to predicate a model for functionalization of the present ultra-large pore crystalline material based on derivatization of other porous inorganic solids.

Accordingly it is an object of the invention to provide a method for functionalizing novel ultra-large pore crystalline material.

It is a further object to provide a method for adjusting the pore size of the crystalline material by reactions forming functional groups within the pores.

It is another object to provide a method by which essentially all, i.e. over 90%, of the hydroxyls within the pores can be functionalized.

It is yet another object to modify the catalytic activity of the crystalline material by incorporating functional groups within the pore structure.

SUMMARY OF THE INVENTION

The present invention is a method for modifying a composition of matter comprising an inorganic, porous, non-layered crystalline phase material exhibiting, after calcination, an X-ray diffraction pattern with at least one peak at a d-spacing greater then about 18 Angstrom Units and having a benzene adsorption capacity of greater than 15 grams benzene per 100 grams of said material at 50 torr and 25° C., by incorporating functional groups into the crystalline material. The method comprises contacting the crystalline material, before or after calcination, with a treatment composition which comprises $M'X'Y'_n$ wherein M' is selected from a group consisting of Groups IIA, IIIA, IVA, VA, VIA, VIIIA, IB, IIB, IIIB, IVB, VB and VIB of the Periodic Table of the Elements; X' is selected from a group consisting of halides, hydrides, alkoxides of $C_{1-6}$, alkyl of $C_{1-18}$, alkenyl of $C_{1-18}$ and aryl of $C_{1-8}$, acetate, aryloxide of $C_{1-18}$, sulfonates and nitrates; Y' is selected from the group consisting of X' amines, phosphines, sulfides, carbonyls and cyanos; and, $n=1-5$.

In a preferred embodiment, the composition of matter comprises an inorganic, porous crystalline phase material having a hexagonal arrangement of uniformly-sized pores at least about 13 Angstroms in diameter and exhibiting, after calcination, a hexagonal electron diffraction pattern that can be indexed with a $d_{100}$ value greater than 18 Angstrom Units.

Advantageously, the modification can be carried out on the as-synthesized crystalline material without the necessity for removing residual organics. In addition, essentially all internal hydroxyl sites can be functionalized if desired.

DETAILED DESCRIPTION OF THE INVENTION

The new class of molecular sieves to be treated according to the invention has a unique property wherein a high concentration of hydroxyl groups may be present within the pore openings of the as-synthesized or calcined material. The method of the invention uses the reaction of these groups, where organics from the synthesis mixture may remain, with a treatment compound comprising $M'X'Y'_n$ to anchor or incorporate functional groups into the molecular sieve material. The functional groups can provide unique catalytic sites within the pores or can act as pore size reducing agents so that the pore size can tailored as desired. The functional groups can also serve as precursors to ceramic materials.

A functional group will be understood to be a characteristic reactive, covalently bonded group of a chemical compound and functionalization will be understood to be the incorporation of covalently bonded functional groups into the molecular sieve material.

The functionalization reaction may be described according to the formula $$Si-O-R' + M'X'Y'_n \rightarrow SiOM'Y'_n + R'X'$$

Si—O—R' is a site in the lattice of the crystalline material.

R'=H+ or R₄N+ which is the organic cation specified in the crystallization methods described hereinbelow.

M'=elements of Groups IIA, IIIA, IVA, VA, VIA, VIIIA, IB, IIB, IIIB, IVB, VB, or VIB of the Periodic Table of the Elements, (Sargent-Welch Scientific Co. Cat. No. S-18806, 1979). Preferred elements for M' are Groups IVA, VIA, VIIIA, IIIB and IVB, and most preferred elements for M' are titanium, chromium, iron, cobalt, nickel, boron, aluminum and silicon.

X'=halides, hydrides, alkoxides of 1-6 carbon atoms, alkyl of 1-18 carbon atoms, aryl of 1-18 carbon atoms, acetates, aryloxides of 1-18 carbon atoms, sulfonates and nitrates. Preferred substitutents for X' are halides, alkoxides of 1-6 carbon atoms and acetates. Most preferred substituents for X' are halides, alkoxides of 1-6 carbon atoms and acetates.

Y' can be selected from the substituents described for X' or amines, phosphines, sulfides, carbonyls and cyanos. Preferred substituents for Y' are those described for X', amines, sulfides and alkyls with b 1-18 carbon atoms. Most preferred substituents for Y' are those described for X', amines and alkyls with 1-18 carbon atoms; n−1-5.

Nonlimiting examples for M'X'Y'n include chromium acetate, chromium nitrate, tetraethylorthosilicate, tetramethylorthosilicate, titanium tetraethoxide, aluminum isopropoxide, aluminum tri-sec butoxide, hexamethyldisilazane, di-sec-butoxyaluminoxytriethoxysilane, diethylphosphatoethyltriethyoxysilane, trimethylborate, chlorodimethylalkylsilane wherein alkyl has 1-18 carbon atoms, ammonia-borane, borane-tetrahydrofuran and dimethysulfidedibromoborane.

The ratio of treatment composition to treated composition of matter, duration of treatment and temperature are not critical and may vary within wide limits. The temperature may be, for example, from about −70° C. to about 250° C., with from about 25° C. to about 100° C. preferred; and the time may be from about 0.1 to about 100 hours, with from about 0.1 to about 30 hours preferred and from about 0.1 to about 24 hours most preferred.

The treated crystalline material can be used as is or may be further subjected to a thermal treatment or treatment with a reactive gas such as oxygen or carbon monoxide for activation. The treated material may be calcined in a reactive or inert gas such as NH₃, PH₃, air, O₂, N₂, Ar, SiH₄, H₂ or B₂H₆.

The treated crystalline material may be described as having functional groups within it according to the formula

These functionalized sites may be, for example:

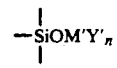

—SiOB(OMe)₂, —SiOB(Br)₂·SMe₂, —SiOTi(OEt)₃, —SiOCr(acetate)₂, —SiOCr(nitrate)₂, —SiOSi(OMe)₃, —SiOAl(s-OPr)₂, —SiOAl(s-OBu)₂, —SiOSi(OEt)₃,

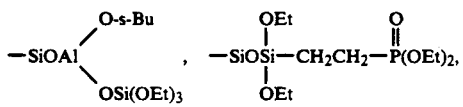

—SiOSi(CH₃)₃, —SiOSi(CH₃)₂C₆H₁₃, —SiOSi(CH₃)₂C₁₈H₃₇, —SiOSi(CH₃)₂C₆H₅.

Me═CH₃, Et═C₂H₅, Pr═C₃H₇, Bu═C₄H₉

In these examples, —Si represents a site in the lattice of the crystalline material. Two additional bonds on the Si are not shown. The invention is not limited to these listed functionalized sites.

As demonstrated hereinafter, the inorganic, non-layered mesoporous crystalline material of this invention has the following composition:

$$M_{n/q}(W_a X_b Y_c Z_d O_h)$$

wherein W is a divalent element, such as a divalent first row transition metal, e.g. manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c and d are mole fractions of W, X, Y and Z, respectively; h is a number of from 1 to 2.5; and (a+b+c+d) =1.

A preferred embodiment of the above crystalline material is when (a+b+c) is greater than d, and h=2. A further embodiment is when a and d=0, and h=2.

In the as-synthesized form, the material of this invention has a composition, on an anhydrous basis, expressed empirically as follows:

$$rRM_{n/q}(W_a X_b Y_c Z_d O_h)$$

wherein R is the total organic material not included in M as an ion, and r is the coefficient for R, i.e. the number of moles or mole fraction of R.

The M and R components are associated with the material as a result of their presence during crystallization, and are easily removed or, in the case of M, replaced by post-crystallization methods hereinafter more particularly described.

To the extent desired, the original M, e.g. sodium ions of the as-synthesized material of this invention can be replaced in accordance with techniques well known in the art, at least in part, by ion exchange with other ions. Preferred replacement ions include metal ions, hydrogen ions, hydrogen precursor, e.g. ammonium, ions and mixtures thereof. Particularly preferred ions are those which tailor the catalytic activity for certain hydrocarbon conversion reactions. These include hydrogen, rare earth metals and metals of Group IA (e.g. K), IIA (e.g. Ca), VIIA (e.g. Mn), VIIIA (e.g. Ni), IB (e.g. Cu), IIB (e.g. Zn), IIIB (e.g. In), IVB (e.g. Sn), and VIIB (e.g. F) of the Periodic Table of the Elements (Sargent-Welch Scientific Co. Cat. No. S-18806, 1979) and mixtures thereof.

The crystalline (i.e. meant here as having sufficient order to provide a diffraction pattern such as, for example, by X-ray, electron or neutron diffraction, following calcination with at least one peak) mesoporous material of this invention may be characterized by its heretofore unknown structure, including extremely large pore windows, and high sorption capacity. The term "mesoporous" is used here to indicate crystals having uniform pores within the range of at least about 13 Angstroms or from about 13 Angstroms to about 200 Angstroms. The materials of this invention will have uniform pores within the range of from about 13 Angstroms to about 200 Angstroms, more usually from about 15 Angstroms to about 100 Angstroms. For the purposes of this application, a working definition of "porous" is a material that adsorbs at least 1 gram of a small molecule, such as Ar, $N_2$, n-hexane or cyclohexane, per 100 grams of the solid.

The material of the present invention can be distinguished from other porous inorganic solids by the regularity of its large open pores, whose pore size more nearly resembles that of amorphous or paracrystalline materials, but whose regular arrangement and uniformity of size (pore size distribution within a single phase of, for example, $\pm 25\%$, usually $\pm 15\%$ or less of the average pore size of that phase) resemble more those of crystalline framework materials such as zeolites. In one form the material appears to have a hexagonal arrangement of large channels that can be synthesized with open internal diameters from about 13 Angstroms to about 200 Angstroms. The term "hexagonal" is intended to encompass not only materials that exhibit mathematically perfect hexagonal symmetry within the limits of experimental measurement, but also those with significant observable deviations from that ideal state. A working definition as applied to the microstructure of the present invention would be that most channels in the material would be surrounded by six nearest neighbor channels at roughly the same distance. Defects and imperfections will cause significant numbers of channels to violate this criterion to varying degrees, depending on the quality of the material's preparation. Samples which exhibit as much as $\pm 25\%$ random deviation from the average repeat distance between adjacent channels still clearly give recognizable images of the present ultra-large pore materials. Comparable variations are also observed in the $d_{100}$ values from the electron diffraction patterns.

Some of these preparations of the material of the present invention give an X-ray diffraction pattern with a few distinct maxima in the extreme low angle region. The positions of these peaks approximately fit the positions of the hk0 reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material in them. Other techniques to illustrate the microstructure of this material are transmission electron microscopy and electron diffraction. Properly oriented specimens of the material show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hk0 projection of the hexagonal lattice and is related to the repeat distance $a_0$ between channels observed in the electron micrographs through the formula $d_{100} = a_0 \sqrt{3}/2$. This $d_{100}$ spacing observed in the electron diffraction patterns corresponds to the d-spacing of a low angle peak in the X-ray diffraction pattern of the material. The most highly ordered preparations of the material obtained so far have 20–40 distinct spots observable in the electron diffraction patterns. These patterns can be indexed with the hexagonal hk0 subset of unique reflections of 100, 110, 200, 210, etc., and their symmetry-related reflections.

In its calcined form, the crystalline material of the invention may be further characterized by an X-ray diffraction pattern with at least one peak at a position greater than about 18 Angstrom Units d-spacing (4.909 degrees two-theta for Cu K-alpha radiation) which corresponds to the $d_{100}$ value of the electron diffraction pattern of the material, and an equilibrium benzene adsorption capacity of greater than about 15 grams benzene/100 grams crystal at 50 torr and 25° C. This sorption is based on the assumption that the crystal material has been treated if necessary in an attempt to insure no pore blockage by incidental contaminants.

The equilibrium benzene adsorption capacity characteristic of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the crystal of the invention.

More particularly, the calcined crystalline non-layered material of the invention may be characterized by an X-ray diffraction pattern with at least two peaks at positions greater than about 10 Angstrom Units d-spacing (8.842 degrees two-theta for Cu K-alpha radiation), at least one of which is at a position greater than about 18 Angstrom Units d-spacing, and no peaks at positions less than about 10 Angstrom units d-spacing with relative intensity greater than about 20% of the strongest peak. Still more particularly, the X-ray diffraction pattern of the calcined material of this invention will have no peaks at positions less than about 10 Angstrom units d-spacing with relative intensity greater than about 10% of the strongest peak. In any event, at least one peak in the X-ray diffraction pattern will have a d-spacing that corresponds to the $d_{100}$ value of the electron diffraction pattern of the material.

Still more particularly, the calcined inorganic, non-layered crystalline material of the invention is characterized as having a pore size of about 13 Angstroms or greater as measured by physisorption measurements, hereinafter more particularly set forth. Pore size is considered a maximum perpendicular cross-section pore dimension of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The materials of the present invention that have the largest pore sizes may require more highly collimated incident X-ray beams in order to resolve the low angle peak from the transmitted incident X-ray beam.

The diffraction data were recorded by step-scanning at 0.04 degrees of two-theta, where theta is the Bragg angle, and a counting time of 10 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75-100), s=strong (50-74), m=medium (25-49) and w=weak (0-24). It should be understood that diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the material of the invention, after dehydration or calcination at, for example, about 450° C.-700° C. or about 540° C. for at least about one hour and other treatment, if necessary, in an attempt to remove any pore blocking contaminants, at 25° C. and 50 torr benzene until equilibrium is reached. The weight of benzene sorbed is then determined as more particularly described hereinafter.

When used as a sorbent or catalyst component, the composition of the invention should be subjected to treatment to remove part or all of any organic constituent. The present composition can also be used as a catalyst component in intimate combination with a hydrogenating component such as tungsten, vanadium, molybdenum, rhenium, nickel, cobalt, chromium, manganese, or a noble metal such as platinum or palladium or mixtures thereof where a hydrogenation-dehydrogenation function is to be performed. Such component can be in the composition by way of co-crystallization, exchanged into the composition to the extent a Group IIIB element, e.g. aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

The above crystalline material, especially in its metal, hydrogen and ammonium forms can be beneficially converted to another form by thermal treatment (calcination). This thermal treatment is generally performed by heating one of these forms at a temperature of at least 370° C. or 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 925° C., or up to 750° C. with the hexagonal form. The thermally treated product is particularly useful in the catalysis of certain hydrocarbon conversion reactions.

The crystalline material of this invention, when employed either as an adsorbent or as a catalyst component in an organic compound conversion process should be dehydrated, at least partially. This can be done by heating to a temperature in the range of 200° C. to 595° C. in an atmosphere such as air, nitrogen, etc. and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

The usual method for synthesis of the ultra-large pore crystalline material involves preparation of a particular reaction mixture comprising sources of alkali or alkaline earth metal cation, if desired, one or a combination of oxides selected from the group consisting of divalent element, trivalent element, tetravalent element and pentavalent element, an organic directing agent and solvent or solvent mixture, maintaining said mixture under sufficient conditions of pH, temperature and time for formation of said composition of matter, and recovering said composition of matter. In this usual method, the organic directing agent is an ion of the formula $R_1R_2R_3R_4Q^+$, wherein Q is nitrogen or phosphorus and wherein at least one of $R_1$, $R_2$, $R_3$ and $R_4$ is aryl or alkyl of from 6 to about 36 carbon atoms or combinations thereof, the remainder of $R_1$, $R_2$, $R_3$ and $R_4$ being selected from the group consisting of hydrogen, alkyl of from 1 to 5 carbon atoms and combinations thereof. The compound from which the above organic directing agent ammonium or phosphonium ion is derived may be, for example, the hydroxide, halide, silicate or mixture thereof. The solvent or solvent mixture for use in the usual method comprises a $C_1$-$C_6$ alcohol, $C_1$-$C_6$ diol, water or mixture thereof, with water preferred.

A first method involves a reaction mixture having an $X_2O_3/YO_2$ mole ratio of from 0 to about 0.5, but an $Al_2O_3/SiO_2$ mole ratio of from 0 to 0.01, a crystallization temperature of from about 25° C. to about 250° C., preferably from about 50° C. to about 175° C., and an organic directing agent, hereinafter more particularly described, or, preferably a combination of that organic directing agent plus an additional organic directing agent, hereinafter more particularly described. This first method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, an organic (R) directing agent, hereinafter more particularly described, and a solvent or solvent mixture, such as, for example, $C_1$-$C_6$ alcohols, $C_1$-$C_6$ diols and/or water, especially water, said reaction mixture having a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $Al_2O_3/SiO_2$ | 0 to 0.01 | 0.001 to 0.01 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/ $(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/ (YO_2 + WO + Z_2O_5 + X_2O_3)$ | 0.01 to 20 | 0.05 to 5 |
| $M_{2/e}O/ (YO_2 + WO + Z_2O_5 + X_2O_3)$ | 0 to 10 | 0 to 5 |
| $R_{2/f}O/ (YO_2WO + Z_2O_5 + X_2O_3)$ | 0.01 to 2.0 | 0.03 to 1.0 | wherein e and f are the weighted average valences of M and R, respectively.

In this first method, when no Z and/or W oxides are added to the reaction mixture, the pH is important and must be maintained at from about 9 to about 14. When Z and/or W oxides are present in the reaction mixture, the pH is not narrowly important for synthesis of the present crystalline material. In this, as well as the following methods for synthesis of the present material the $R_{2/f}O/(YO_2+WO+Z_2O_5+X_2O_3)$ ratio is important. When this ratio is less than 0.01 or greater than 2.0, impurity products tend to be synthesized at the expense of the present material.

A second method for synthesis of the present crystalline material involves a reaction mixture having an $X_2O_3/YO_2$ mole ratio of from about 0 to about 0.5, a crystallization temperature of from about 25° C. to about 250° C., preferably from about 50° C. to about 175° C., and two separate organic directing agents, i.e. the organic and additional organic directing agents, hereinafter more particularly described. This second method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, a combination of organic directing agent and additional organic directing agent (R), each hereinafter more particularly described, and solvent or solvent mixture such as, for example, $C_1$-$C_6$ alcohols, $C_1$-$C_6$ diols and/or water, especially water, said reaction mixture having a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/ $(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/ (YO_2 + WO + Z_2O_5 + X_2O_3)$ | 0.01 to 20 | 0.05 to 5 |
| $M_{2/e}O/ (YO_2 + WO+ Z_2O_5 + X_2O_3)$ | 0 to 10 | 0 to 5 |
| $R_{2/f}O/ (YO_2 + WO + Z_2O_5 + X_2O_3)$ | 0.1 to 2.0 | 0.12 to 1.0 | wherein e and f are the weighted average valences of M and R, respectively.

In this second method, when no Z and/or W oxides are added to the reaction mixture, the pH is important and must be maintained at from about 9 to about 14. When Z and/or W oxides are present in the reaction mixture, the pH is not narrowly important for crystallization of the present invention.

A third method for synthesis of the present crystalline material is where X comprises aluminum and Y comprises silicon, the crystallization temperature must be from about 25° C. to about 175° C., preferably from about 50° C. to about 150° C., and an organic directing agent, hereinafter more particularly described, or, preferably a combination of that organic directing agent plus an additional organic agent, hereinafter more particularly described, is used. This third method comprises preparing a reaction mixture containing sources of, for example, alkali or alkaline earth metal (M), e.g. sodium or potassium, cation if desired, one or more sources of aluminum and/or silicon, an organic (R) directing agent, hereinafter more particularly described, and a solvent or solvent mixture, such as, for example $C_1$-$C_6$ alcohols, $C_1$-$C_6$ diols and/or water, especially water, said reaction mixture having a composition, in terms of mole ratios of oxides, within the following ranges:

| Reactants | Useful | Preferred |
|---|---|---|
| $Al_2O_3/SiO_2$ | 0 to 0.5 | 0.001 to 0.5 |
| Solvent/$SiO_2$ | 1 to 1500 | 5 to 1000 |
| $OH^-/SiO_2$ | 0 to 10 | 0 to 5 |
| $(M_{2/e}O + R_{2/f}O)/ (SiO_2 + Al_2O_3)$ | 0.01 to 20 | 0.05 to 5 |
| $M_{2/e}O/ (SiO_2 + Al_2O_3)$ | 0 to 5 | 0 to 3 |
| $R_{2/f}O/ (SiO_2 + Al_2O_3)$ | 0.01 to 2 | 0.03 to 1 | wherein e and f are the weighted average valences of M and R, respectively.

In this third method, the pH is important and must be maintained at from about 9 to about 14. This method involves the following steps:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) To the primary template mixture of step (1) add the sources of oxides, e.g. silica and/or alumina such that the ratio of $R_{2/f}O/(SiO_2+Al_2O_3)$ is within the range of from about 0.01 to about 2.0.

(3) Agitate the mixture resulting from step (2) at a temperature of from about 20° C. to about 40° C., preferably for from about 5 minutes to about 3 hours.

(4) Allow the mixture to stand with or without agitation, preferably at a temperature of from about 20° C. to about 100° C., and preferably for from about 10 minutes to about 24 hours.

(5) Crystallize the product from step (4) at a temperature of from about 50° C. to about 175° C., preferably for from about 1 hour to about 72 hours. Crystallization temperatures higher in the given ranges are most preferred.

A fourth method for the present synthesis involves the reaction mixture used for the third method, but the following specific procedure with tetraethylorthosilicate the source of silicon oxide:

(1) Mix the organic (R) directing agent with the solvent or solvent mixture such that the mole ratio of solvent/$R_2/O$ is within the range of from about 50 to about 800, preferably from about 50 to 500. This mixture constitutes the "primary template" for the synthesis method.

(2) Mix the primary template mixture of step (1) with tetraethylorthosilicate and a source of aluminum oxide, if desired, such that the $R_2/O/SiO_2$ mole ratio is in the range of from about 0.05 to about 2.0.

(3) Agitate the mixture resulting from step (2) for from about 10 minutes to about 6 hours, preferably from about 30 minutes to about 2 hours, at a temperature of from about 0° C. to about 25° C., and a pH of less than 12. This step permits hydrolysis/polymerization to take place and the resultant mixture will appear cloudy.

(4) Crystallize the product from step (3) at a temperature of from about 25° C to about 150° C., preferably from about 95° C. to about 110° C., for from about 4 to about 72 hours, preferably from about 16 to about 48 hours.

A fifth method includes adding an auxiliary organic to the reaction mixture prior to maintaining it for crystallization of the ultra-large pore crystalline material, such as prior to, during or immediately following addition of the other reaction mixture components. It is believed that the "primary template" in this method becomes the mixture of the auxiliary organic and the organic directing agent or organic directing agent mixture. This auxiliary organic must be selected from the group of organic compounds consisting of (1) aromatic hydrocarbons and carbons and halogen- and $C_1$-$C_{14}$ alkyl-substituted derivatives thereof, (2) cyclic aliphatic hydrocarbons and amines of from 5 to 20 carbons and halogen- and $C_1$-$C_{14}$ alkyl-substituted derivatives thereof, (3) polycyclic aliphatic hydrocarbons and amines of from 6 to 20 carbons and halogen- and $C_1$-$C_{14}$ alkyl-substituted derivatives thereof, (4) straight and branched aliphatic hydrocarbons and amines of from 3 to 16 carbons and halogen-substituted derivatives thereof, and (5) combinations thereof. Of this group of organic compounds, the aromatic hydrocarbons (e.g. $C_6$-$C_{20}$), cyclic aliphatic hydrocarbons and polycyclic aliphatic hydrocarbons, and combinations thereof, are preferred.

In this group of auxiliary organic compounds for use in the present improved method, the halogen substituent in substituted derivatives may be, for example, bromine. The $C_1$-$C_{14}$ alkyl substituent in the substituted derivatives may be linear or branched aliphatic chains, such as, for example, methyl, ethyl, propyl, isopropyl, butyl, pentyl and combinations thereof. Non-limiting examples of these auxiliary organics include, for example, p-xylene, trimethylbenzene, triethylbenzene and triisopropylbenzene.

With the inclusion of the auxiliary organic into the reaction mixture, the mole ratio of auxiliary organic/$YO_2$ will be from about 0.05 to about 20, preferably from about 0.1 to about 10, and the mole ratio of auxiliary organic/$R_2/O$ will be from about 0.02 to about 100, preferably from about 0.05 to about 35. The useful range of temperatures for this crystallization is from about 25° C. to about 175° C., preferably from about 50° C. to about 150° C. Pore size and volume will vary with the amount and physical properties, e.g. structure, boiling point, density, polarity, etc., of the auxiliary organic used.

In each of the above methods, batch crystallization of the present crystalline material can be carried out under either static or agitated, e.g. stirred, conditions in a suitable reactor vessel, such as for example, polypropylene jars or teflon lined or stainless steel autoclaves. Crystallization may also be conducted continuously in suitable equipment. The total useful range of temperatures for crystallization is noted above for each method for a time sufficient for crystallization to occur at the temperature used, e.g. from about 5 minutes to about 14 days. Thereafter, the crystals are separated from the liquid and recovered.

When a source of silicon is used in the synthesis method, it is preferred to use at least in part an organic silicate, such as, for example, a quaternary ammonium silicate. Non-limiting examples of such a silicate include tetramethylammonium silicate and tetraethylorthosilicate.

Non-limiting examples of various combinations of W, X, Y and Z contemplated for the first and second synthesis methods of the present invention include:

| W  | X  | Y  | Z  |
|----|----|----|----|
| —  | Al | Si | —  |
| —  | Al | —  | P  |
| —  | Al | Si | P  |
| Co | Al | —  | P  |
| Co | Al | Si | P  |
| —  | —  | Si | —  | including the combinations of W being Mg, or an element selected from the divalent first row transition metals, e.g. Mn, Co and Fe; X being B, Ga or Fe; and Y being Ge.

An organic directing agent for use in each of the above methods for synthesizing the present material from the respective reaction mixtures is an ammonium or phosphonium ion of the formula $R_1R_2R_3R_4Q^+$, i.e.:

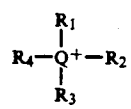

wherein Q is nitrogen or phosphorus and wherein at least one of $R_1$, $R_2$, $R_3$ and $R_4$ is aryl or alkyl of from 7 to about 36 carbon atoms, e.g. —$C_7H_{15}$, —$C_{10}H_{21}$, —$C_{12}H_{25}$, —$C_{14}H_{29}$, —$C_{16}H_{33}$ and —$C_{18}H_{37}$, or combinations thereof, the remainder of $R_1$, $R_2$, $R_3$ and $R_4$ being selected from the group consisting of hydrogen, alkyl of from 1 to 5 carbon atoms and combinations thereof. The compound from which the above ammonium or phosphonium ion is derived may be, for example, the hydroxide, halide, silicate, or mixtures thereof.

In the first and third methods above it is preferred to have an additional organic directing agent and in the second method it is required to have a combination of the above organic directing agent and an additional organic directing agent. That additional organic directing agent is the ammonium or phosphonium ion of the above directing agent formula wherein $R_1$, $R_2$, $R_3$ and $R_4$ together or separately are selected from the group consisting of hydrogen and alkyl of 1 to 5 carbon atoms and combinations thereof. Any such combination of organic directing agents go to make up "R" and will be in molar ratio of about 100/1 to about 0.01/1, first above listed organic directing agent/additional organic directing agent.

The particular effectiveness of the presently required directing agent, when compared with other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, cetyltrimethylphosphonium, octadecyltrimethylphosphonium, benzyltrimethylammonium, cetylpyridinium, myristyltrimethylammonium, dodecyltrimethylammonium and dimethyldidodecylammonium.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The present compositions are useful as catalyst components for catalyzing the conversion of organic compounds, e.g. oxygenates and hydrocarbons, by acid-catalyzed reactions. The size of the pores is also such that the spatiospecific selectivity with respect to transition state species is minimized in reactions such as cracking (Chen et al., "Shape Selective Catalysts in Industrial Applications", 36 CHEMICAL INDUSTRIES, pgs. 41-61 (1989) to which reference is made for a discussion of the factors affecting shape selectivity). Diffusional limitations are also minimized as a result of the very large pores in the present materials. For these reasons, the present compositions are especially useful for catalyzing reactions which occur in the presence of acidic sites on the surface of the catalyst and which involve reactants, products or transitional state species which have large molecular sizes, too great for undergoing similar reactions with conventional large pore size solid catalysts, for example, large pore size zeolites such as zeolite X, Y, L, ZSM-4, ZSM-18, and ZSM-20.

Thus, the present catalytic compositions will catalyze reactions such as cracking, and hydrocracking, and other conversion reactions using hydrocarbon feeds of varying molecular sizes, but with particular applicability to feeds with large molecular sizes such as highly aromatic hydrocarbons with substituted or unsubstituted polycyclic aromatic components, bulky naphthionic compounds or highly substituted compounds with bulky steric configurations, e.g. molecular sizes of about 13 Angstroms or more. The present catalytic compositions are particularly useful for reactions in which the molecular weight of the feed is reduced to a lower value, i.e. to reactions involving cracking such as cracking or hydrocracking. Cracking may be conducted at a temperature of from about 200° C. to about 800° C., a pressure of from about atmospheric to about 100 psig and contact time of from about 0.1 second to about 60 minutes. Hydrocracking may be conducted at a temperature of from about 150° C. to about 550° C., a pressure of from about 100 psig to about 3000 psig, and a weight hourly space velocity of from about 0.1 hr $^{-1}$ to about 100 hr $^{-1}$, with a hydrogen/hydrocarbon molar ratio of from about 0.1 to about 100.

The catalytic compositions of matter according to the present invention may also be used for selective conversion of inorganic compounds such as oxides of nitrogen in mixtures of gases which contain nitrogen oxides ($NO_x$), for example, industrial exhaust gases and the gases formed during the oxidative regeneration of catalysts used in the processing of hydrocarbons, especially in catalytic cracking operations. The porous crystalline material may be used in a matrixed or unmatrixed form for this purpose and may suitably be formed into extrudates, pellets or other shapes to permit the passage of gases over the catalyst with the minimum pressure drop. The crystalline material is preferably at least partly in the hydrogen form, but it may advantageously contain a minor amount of noble metal as a catalytic component, especially a metal of Periods 5 and 6 Group VIIIA of the Periodic Table, especially platinum, palladium, ruthenium, rhodium, iridium or mixtures thereof. Amounts of noble metal up to about 1 weight percent are typical with lower amounts, e.g. up to about 0.1 or 0.5 weight percent being preferred.

The $NO_x$ reduction is suitably conducted by passing the gas containing the oxides of nitrogen over the catalyst at an elevated temperature, typically at least 200° C., and usually within the range of 200° to 600° C. The gas mixture may be mixed with ammonia to promote reduction of the oxides of nitrogen and pre-mixing may be conducted at a temperature of up to about 200° C. The amount of ammonia which is mixed with the gas mixture is typically within the range of 0.75 to 1.25 the stoichiometric amount, which itself varies according to the ratio of the different oxides of nitrogen in the gas mixture, as shown by the equations:

$$6NO_2 + 8NH_3 = 7N_2 + 12H_2O$$

$$6NO + 4NH_3 = 5N_2 + 6H_2O$$

The crystalline catalytic compositions of matter may also be used for the reduction of oxides of nitrogen in gaseous mixtures in the presence of other reducing agents such as carbon or carbon monoxide. Reduction of the oxides of nitrogen in this way is of particular utility in the regeneration of fluid catalytic cracking (FCC) catalysts, since regeneration under appropriate conditions will produce the required concentrations of carbon monoxide which may then be used to reduce the proportion of $NO_x$ in the regeneration gases in the presence of the catalyst.

Because the present catalytic compositions have been found to be stable, their use as cracking catalysts, e.g. in fluid catalytic cracking processes, with resid feeds will represent an especially favorable mode of utilization. Still further, they may be used in combination with one or more other catalyst components such as, for example, cracking catalysts comprising silica-alumina and/or zeolite Y, e.g. USY.

The present catalytic compositions are especially useful for reactions using high molecular weight, high boiling or non-distillable feeds, especially residual feeds, i.e. feeds which are essentially non-distillable or feeds which have an initial boiling point (5% point) above about 1050° F. Residual feeds which may be used with the present catalytic compositions include feeds with API gravities below about 20, usually below 15 and typically from 5 to 10 with Conradsen Carbon Contents (CCR) of at least 1% by weight and more usually at least 5% or more, e.g. 5–10%. In some resid fractions the CCR may be as high as about 20 weight percent or even higher. The aromatic contents of these feeds will be correspondingly high, as may the contents of heteroatoms such as sulfur and nitrogen, as well as metals. Aromatics content of these feeds will usually be at least 50 weight percent and typically much higher, usually at least 70 or 80 weight percent, with the balance being principally naphthenes and heterocyclics. Typical petroleum refinery feeds of this type include atmospheric and vacuum tower resids, asphalts, aromatic extracts from solvent extraction processes, e.g. phenol or furfural extraction, deasphalted oils, slop oils and residual fractions from various processes such as lube production, coking and the like. High boiling fractions with which the present catalytic compositions may be used include gas oils, such as atmospheric gas oils; vacuum gas oils; cycle oils, especially heavy cycle oil; deasphalted oils; solvent extracts, such as bright stock; heavy gas oils, such as coker heavy gas oils; and the like. The present catalytic material may also be utilized with feeds of non-petroleum origin, for example, synthetic oils produced by coal liquefaction, Fischer-Tropsch waxes and heavy fractions and other similar materials.

The compositions of this invention can also be used as adsorbents and separation vehicles in pharmaceutical and fine chemical applications. For example, these ultra-large pore compositions may be used in the purification of drugs like insulin or be used as solid vehicles for the controlled delivery of drugs. Another application for use of these ultra-large pore materials involves waste disposal where the extraordinary pore volumes are exploited. Therefore, at least one component can be partially or substantially totally separated from a mixture of components having differential sorption characteristics with respect to the present ultra-large pore composition by contacting the mixture with the composition to selectively sorb the one component. Examples of this include contacting a mixture comprising water and at least one hydrocarbon component, whereby at least one hydrocarbon component is selectively sorbed. Another example includes selective sorption of at least one hydrocarbon component from a mixture comprising same and at least one additional hydrocarbon component.

As in the case of many catalysts, it may be desired to incorporate the new crystal composition with another material resistant to the temperatures and other conditions employed in organic conversion processes. Such materials include active and inactive materials and synthetic or naturally occurring zeolites as well as inorganic materials such as clays, silica and/or metal oxides such as alumina, titania and/or zirconia. The latter may be either naturally occurring or in the form of gelatinous precipitates or gels including mixtures of silica and metal oxides. Use of a material in conjunction with the new crystal, i.e. combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated with naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the new crystal can be composited with a porous matrix such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

It may be desirable to provide at least a part of the foregoing matrix in colloidal form so as to facilitate extrusion of the bound catalyst components(s).

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented. In the examples, whenever sorption data are set forth for comparison of sorptive capacities for water, cyclohexane, benzene and/or n-hexane, they are equilibrium adsorption values determined as follows:

A weighed sample of the adsorbent, after calcination at about 540° C. for at least about 1 hour and other treatment, if necessary, to remove any pore blocking contaminants, is contacted with the desired pure adsorbate vapor in an adsorption chamber. The increase in weight of the adsorbent is calculated as the adsorption capacity of the sample in terms of grams/100 grams adsorbent based on adsorbent weight after calcination at about 540° C. The present composition exhibits an equilibrium benzene adsorption capacity at 50 Torr and 25° C. of greater than about 15 grams/100 grams, particularly greater than about 17.5 grams/100 grams and more particularly greater than about 20 grams/100 grams.

A preferred way to do this is to contact the desired pure adsorbate vapor in an adsorption chamber evacuated to less than 1 mm at conditions of 12 Torr of water vapor, 40 Torr of n-hexane or cyclohexane vapor, or 50 Torr of benzene vapor, at 25° C. The pressure is kept constant (within about ±0.5 mm) by addition of adsorbate vapor controlled by a manostat during the adsorption period. As adsorbate is adsorbed by the new crystal, the decrease in pressure causes the manostat to open a valve which admits more adsorbate vapor to the chamber to restore the above control pressures. Sorption is complete when the pressure change is not sufficient to activate the monostat.

Another way of doing this for benzene adsorption data is on a suitable thermogravimetric analysis system, such as a computer-controlled 990/951 duPont TGA system. The adsorbent sample is dehydrated (physically sorbed water removed) by heating at, for example, about 350° C. or 500° C. to constant weight in flowing helium. If the sample is in as-synthesized form, e.g. containing organic directing agents, it is calcined at about 540° C. in air and held to constant weight instead of the previously described 350° C. or 500° C. treatment. Benzene adsorption isotherms are measured at 25° C. by blending a benzene saturated helium gas stream with a pure helium gas stream in the proper proportions to obtain the desired benzene partial pressure. The value of the adsorption at 50 Torr of benzene is taken from a plot of adsorption isotherm.

In the examples, percentages are by weight unless otherwise indicated.

EXAMPLE 1

A solution of 2.7 grams of $NaAlO_2$ (43.5% $Al_2O_3$, 30% $Na_2O$) in 146.9 grams of water was mixed with 34.5 grams of NaOH, 189.1 grams of cetyltrimethylammonium hydroxide solution prepared by contacting a 29 wt % N,N,N-trimethyl-1-hexadecanaminium chloride solution with an excess of hydroxide for halide resin, and 110.7 grams of Ultrasil (92% $SiO_2$). After stirring overnight it was loaded into a 600 cc autoclave and reacted at 150° C. with 400 rpm stirring for 72 hours. The mixture had the following relative molar composition:

0.25 moles $Al_2O_3$
10 moles $Na_2O$
36 moles $SiO_2$
2.5 moles $(CTMA)_2O$
362.5 moles $H_2O$ Following filtration of the mixture, the solid product which precipitated from the filtrate was recovered by filtration, washed with water, then calcined at 550° C. for 10 hours in air.

The calcined product proved to have a surface area of 1193 m²/g and the following equilibrium adsorption capacities in grams/100 grams anhydrous sorbent:

| | |
|---|---|
| $H_2O$ | 10.2 |
| Cyclohexane | >50 |
| n-Hexane | 48.9 |
| Benzene | 68.1 |

The X-ray diffraction pattern of the calcined product of this example may be characterized as including a very strong relative intensity line at 50.7±3.0 Angstroms d-spacing and a weak line at 30.7±1.0 Angstroms.

EXAMPLE 2

A 0.50 gram portion of a calcined product prepared as in Example 1 was added to a rapidly stirred solution of 10 grams chlorotrimethylsilane in 15 grams hexamethyldisiloxane. The mixture was refluxed under $N_2$ overnight, cooled, the reagents removed on a rotary evaporator, the product washed with two 10 mL portions of acetone and air dried to yield 0.53 grams of product.

A solid state magic angle spinning NMR spectrum of this product was obtained using 90 degree pulses at 1200 s intervals with proton decoupling. This spectrum showed peaks at 15 and −108 ppm. The peak at 15 ppm has been assigned to trimethylsilyl groups (T. Yanagisawa, et al., *Reactivity of Solids*, Vol. 5, 167 (1988)) and shows that the product has reacted. Integration of the two peaks showed that 17.9% of the silicons in the original product had been converted.

The internal pore volume of the trimethylsilylated product was compared to that of the starting material by both benzene sorption and argon physisorption. The total reduction in pore volume was measured as 48% by benzene and 34% by argon. The diameter of the TMS group was measured to be about 0.4–0.5 nm from CPK molecular models. An onion skin coating of TMS groups on the inside of the pore should, therefore, cause a decrease of 0.8–1.0 nm in pore diameter. The Horvath-Kowazoe transform of the argon isotherm shows the pore diameter to have decreased from 3.94 to 3.04 nm (0.90 nm) in agreement with what was predicted from the models.

Water sorption was measured before and after the chlorotrimethylsilane treatment. The calcined product of Example 1 sorbed 10.0 weight percent water at 30° C. and 12.5 torr while the treated material sorbed 3.3 weight percent water. This demonstrates that trichloromethylsilane treatment increases the hydrophobic character of the novel crystalline material.

EXAMPLE 3

A 0.50 gram portion of a product prepared as in Example 1 was added to a rapidly stirred solution of 15 mL hexamethyldisilazane in 15 grams hexamethyldisiloxane. The mixture was refluxed under $N_2$ overnight, cooled, the reagents removed on a rotary evaporator, the product washed with two 10 mL portions of acetone and air dried to yield 0.52 grams of product.

A solid state magic angle spinning NMR spectrum of this product obtained using 90 degree pulses at 1200 s intervals with proton decoupling. This spectrum showed peaks at 15 and −108 ppm. The peak 15 ppm has been assigned to trimethylsilyl groups (Id.) and shows that the product has reacted. Integration of the two peaks showed that 16.8% of the silicons in the original product had been converted. Within the experimental error of the Si-nmr experiment, the conversion by chlorotrimethylsilane and hexamethyldisilazane was the same.

Examples 2 and 3 show pore size reduction using the treatment method of the invention.

EXAMPLE 4

Four hundred grams of cetyltrimethylammonium (CTMA) hydroxide solution, prepared by contacting a 29 wt% N,N,N-trimethyl-1-hexadecanaminium chloride solution with an excess of hydroxide-for-halide resin, was combined with two hundred grams of tetramethylammonium (TMA) silicate solution (10% by wt. silica, 1:1,TMA:Si) with stirring. Fifty grams of HiSil, a precipitated hydrated silica containing about 6 wt% free water and about 4.5 wt% bound water of hydration and having an ultimate particle size of about 0.02 micron, was added. The resulting mixture was placed in a polypropylene bottle and put into a steam box (about 100° C.) for 48 hours. The mixture had a composition in terms of moles per mole of $Al_2O_3$:

| | |
|---|---|
| 391.4 moles of $SiO_2$ | |
| 71.4 moles of $(CTMA)_2O$ | |
| 61.6 moles of $(TMA)_2O$ | |
| 9144 moles of $H_2O$ | |

The resulting solid product was recovered by filtration and dried in air at ambient temperature. The chemical analyses of the as-synthesized product were:

| | |
|---|---|
| $SiO_2$ | 23.7 wt % |
| $Al_2O_3$ | 0.2 wt % |
| N | 2.3 wt % |
| C | 33.9 wt % |
| Ash, 1000° C. | 22.1 wt % |

EXAMPLE 5

A portion of the product from Example 4 was then calcined at 540° C. for one hour in nitrogen, followed by six hours in air. The benzene sorption for this material was 39.5 wt%.

EXAMPLE 6

One gram of the air dried product of Example 4 was mixed with one gram titanium tetraethoxide at room temperature for overnight. The mixture was then reacted with 5 grams of water for one hour. The product was calcined in nitrogen at 538° C. for one hour then air for 6 hours at 538° C. The benzene sorption at 30° C. was 25.0 wt%.

EXAMPLE 7

One gram of the air dried product of Example 4 was mixed with one gram aluminum tri-sec-butoxide at room temperature for overnight. The mixture was then reacted with 5 grams of water for one hour. The product was calcined in nitrogen at 538° C. for one hour then air for 6 hours at 538° C. The benzene sorption at 30° C. was 37.5 wt%.

EXAMPLE 8

Ten grams of the air-dried product from Example 4 was combined with Di-s-butoxyaluminoxy-triethyoxylsilane (DBALS), on a 1/1 gram for gram basis, and fifty grams of absolute ethanol and allowed to mix overnight. This mixture was then combined with one hundred grams of water and stirred for one hour. The resulting solid product was recovered by filtration and dried in air at temperature. The functionalized product was then calcined at 540° C. for one hour in nitrogen, followed by six hours in air.

Elemental Analysis of the product of untreated Example 4 is compared with the treated products of Example 8–12 in Table 1 below.

EXAMPLE 9

Ten grams of the air-dried product from Example 4 was combined with Di-s-butoxyaluminoxy-triethyoxylsilane (DBALS), on a 1/1 gram for gram basis, and fifty grams of hexamethyldisiloxane and allowed to mix overnight. This mixture was combined with one hundred grams of water and stirred for one hour. The resulting solid product was recovered by filtration and dried in air at ambient temperature. The functionalized product was then calcined at 540° C. for one hour in nitrogen, followed by six hours in air.

EXAMPLE 10

Ten grams of the air-dried product from Example 4 was combined with Diethylphosphatoethyltriethoxysilane, on a 1/1 gram for gram basis, and fifty grams of absolute ethanol and allowed to mix overnight. This mixture was then combined with one hundred grams of water and stirred for one hour. The resulting solid product was recovered by filtration and dried in air at ambient temperature. The functionalized product was then calcined at 540° C. for one hour in nitrogen, followed by six hours in air.

EXAMPLE 11

Ten grams of the air-dried product from Example 4 was combined with Trimethylborate, on a 2/1 gram for gram basis, and fifty grams of absolute ethanol and allowed to mix overnight. This mixture was then combined with one hundred grams of water and stirred for one hour. The resulting solid product was recovered by filtration and dried in air at ambient temperature. The functionalized product was then calcined at 540° C. for one hour in nitrogen, followed by six hours in air.

EXAMPLE 12

Ten grams of the air-dried product from Example 4 was combined with 7.5 grams of aluminum isopropoxide and fifty grams of absolute ethanol and allowed to mix overnight. This mixture was then combined with one hundred grams of water and stirred for one hour. The resulting solid product was recovered by filtration and dried in air at ambient temperature. The functionalized product was then calcined at 540° C. for one hour in nitrogen, followed by six hours in air.

TABLE 1

| | ELEMENTAL ANALYSES OF SYNTHESIS PRODUCTS | | | | | | |
|---|---|---|---|---|---|---|---|
| | C | N | Si | Al | P | B | Ash, 1000° C. |
| Ex. 4 | 33.0 | 2.32 | 10.9 | 0.052 | — | — | 22.1 |
| Ex. 8 | — | — | 25.9 | 11.2 | — | — | 77.0 |
| Ex. 9 | — | — | 32.3 | 5.2 | — | — | 84.5 |
| Ex. 10 | — | — | 32.9 | — | 4.7 | — | 74.3 |
| Ex. 11 | — | — | 32.1 | — | — | 2.6 | 76.3 |
| Ex. 12 | — | — | 16.2 | 17.7 | — | — | 80.8 |

Examples 6–12 illustrate other types of functional groups which can be incorporated into the crystalline material using the method of the invention. These types of procedures show that novel catalytic sites can be generated. Such catalytic sites are useful for hydrocarbon processing.

EXAMPLE 13

In this example, 1.65 grams of NaAlO$_2$ was added to 80 grams of cetyltrimethylammonium hydroxide (CTMAOH) solution, prepared by contacting a 29 wt.% N,N,N-trimethyl-1-hexadecanaminium chloride solution with a hydroxide-for-halide exchange resin. The mixture was stirred until the NaAlO$_2$ was completely dissolved. To this solution was added 40.0 grams of tetramethylammonium silicate solution (10 wt.% SiO$_2$), 10.0 grams of HiSil (90 wt.% SiO$_2$), and 6.01 grams of 1,3,5-trimethylbenzene. The resulting mixture was stirred at room temperature for several minutes. The gel was then loaded into a 300 ml autoclave and heated to 105° C. while stirring at 150 RPM. After about 4 hours of heating, the reaction was quenched with cold water, and the contents removed. The product was filtered and washed several times with warm (60°-70° C.) distilled water and with acetone. The final product was calcined at 538° C. in a N$_2$/air mixture for 8 hours. The gel reaction mixture had a composition in terms of moles per mole Al$_2$O$_3$ as follows:

1.25 moles Na$_2$O
27.8 moles SiO$_2$
5.1 moles (CTMA)$_2$O
2.24 moles (TMA)$_2$O
650 moles H$_2$O
6.91 moles 1,3,5-trimethylbenzene The calcined product of this example proved to have a surface area of 948.6 m$^2$/g and a benzene adsorption capacity of 64.0 wt.%.

EXAMPLE 14

One gram of the product of Example 13 was mixed with one gram tetraethylorthosilicate at room temperature for overnight. The mixture was then reacted with 5 grams of water for one hour. The product was calcined in nitrogen at 538° C. for one hour then air for 6 hours at 538° C. The benzene sorption at 25° C. was 40.0 wt%. Since the crystalline material had an initial benzene sorption of 64.0 wt%, the pore volume was reduced by 37% suggesting that the pore diameter was reduced by 8 Angstroms.

EXAMPLE 15

To 18.7 gm of N-clear (Na-silicate) dissolved in 30.0 gm of distilled water was added 1.2 gm of sulfuric acid dissolved in 10 gm of water. After allowing the resulting mixture to stir for ten minutes, 16.77 gm cetyltrimethylammonium bromide in 50.2 gm H$_2$O was added and the resulting gel was allowed to stir for 0.5 h. At this point 20 gm of water was added to the reaction. The gel was then crystallized under static, autogenous conditions in a polypropylene bottle (100C). The resulting product was washed thoroughly with distilled water, dried and calcined to 538C. The X-ray diffraction pattern of the calcined product of this example included a very strong relative intensity line at 33.2±2.0 Angstroms d-spacing and weak lines at 19.8±1.0 Angstroms and 17.5±1.0 Angstroms. The benzene sorption for this material was 50%.

EXAMPLE 16

0.5 gm of the product of Example 15 was combined with 10 mL of (CH$_3$)$_2$S:BH$_3$ in 20 mL of toluene. After stirring for ca. 5 minutes the solid was isolated by vacuum filtration, washed with n-hexanes and then washed with acetone. The dried product was then calcined in air to 538° C.

The X-ray diffraction pattern of the product of this example included a very strong relative intensity line at 32.4±2.0 Angstroms d-spacing and weak lines at 19.5±1.0 and 17.2±1.0 Angstroms. The benzene sorption was 41 wt.%. Since the crystalline material of Example 15 had a benzene sorption value of 50%, the pore volume of the material of the present example appears to have been reduced.

EXAMPLE 17

Three grams of calcined crystalline material prepared as described in Example 4 were added to a solution of 0.14 grams chromium acetate monohydrate in 10 grams water. This mixture was reacted overnight at room temperature. Excess moisture was removed under vacuum. The catalyst was dried in nitrogen at 250° C. for 5 hours then air at 600° C. for 9 hours. The temperature was lowered to 350° C. and the sample reduced in carbon monoxide for 30 minutes.

EXAMPLE 18

The product of Example 17 was contacted at 120° C. with 1-decene at 1.91 LHSV. An oligomerization product was isolated and had a viscosity of 2419 centistokes (cS) at 40° C. and 238 cS at 100° C. The calculated viscosity index was 237.

EXAMPLE 19

An oligomerization of 1-decene was carried out as in Example 18 except that the reaction temperature was increased to 182° C. at 1.95 LHSV. The product was isolated by distillation and its viscosity was 197 cS at 40° C. and 27.6 cS at 100° C. The viscosity index was 178.

The products of the oligomerization of Examples 18 and 19 over a crystalline material treated according to the invention, have much higher viscosities than expected in prior art Cr/SiO$_2$ catalysts.

What is claimed is:

1. A method for modifying a composition of matter which comprises an inorganic, porous, non-layered crystalline phase material exhibiting, calcination and/or functionalization, an X-ray diffraction pattern with at least one peak at a d-spacing greater than about 18 Angstrom Units with a relative intensity of 100 and having a benzene adsorption capacity of greater than 15 grams benzene per 100 grams benzene per 100 grams anhydrous crystal at 50 torr and 25° C., comprising:

contacting with a treatment composition comprising M'X'Y'$_n$ wherein
   M' is selected from a group consisting of Periodic Table Groups IIA, IIIA, IVA, VA, VIA, VIIIA, IB, IIB, IIIB, IVB, VB and VIB;
   X' is selected from a group consisting of halides, hydrides, alkoxyides of 1 to about 6 carbon atoms, alkyl of C$_{1-18}$, alkenyl of C$_{1-18}$, aryl of C$_{1-18}$, aryloxide of C$_{1-18}$, sulfonates, nitrates and acetates;
   Y' is selected from a group consisting of X', amines, phosphines, sulfides, carbonyls and cyanos; and
   n=1-5; said contacting occurring under sufficient conditions so that the crystalline phase material is functionalized.

2. The method of claim 1 which further comprises calcining the composition of matter.

3. The method of claim 1 wherein the composition of matter is contacted with the treatment composition before calcination.

4. The method of claim 1 wherein the composition of matter is contacted with the treatment composition after calcination.

5. The method of claim 1 wherein the composition of matter comprises an inorganic, porous crystalline phase material having a hexagonal arrangement of uniformly-sized pores at least about 13 Angstroms in diameter and exhibiting, after calcination, a hexagonal electron diffraction pattern that can be indexed with a $d_{100}$ value greater than 18 Angstrom Units.

6. The method of claim 1 wherein the composition of matter has a composition expressed as follows:

$$M_{n/q}(W_a X_b Y_c Z_d O_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and $(a+b+c+d)=1$.

7. The method of claim 1 wherein the composition of matter has a composition on an anhydrous basis, expressed as follows:

$$rRM_{n/q}(W_a X_b Y_c Z_d O_h)$$

wherein R is the total organic material not included in M; r is the number of moles or mole fraction of R; M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and $(a+b+c+d)=1$, wherein, when treated under conditions sufficient to remove R, said crystalline phase give an X-ray diffraction pattern with at least one peak at a position greater than about 18 Angstrom Units d-spacing and exhibits a benzene adsorption capacity of greater than about 15 grams benzene per 100 grams anhydrous crystal at 50 torr and 25° C.

8. The method of claim 1 wherein the composition of matter comprises an inorganic, non-pillared crystalline phase giving an X-ray diffraction pattern following calcination with at least two peaks at positions greater than about 10 Angstrom Units d-spacing, at least one of which is at a position greater than about 18 Angstrom Units d-spacing, and no peaks at positions less than about 10 Angstrom Units d-spacing with relative intensity greater than about 20% of the, strongest peak.

9. The method of claim 1 wherein M' is selected from a group consisting of Groups IVA, VIA, VIIIA, IIIB and IVB.

10. The method of claim 8 wherein M' is selected from a group consisting of Ti, Cr, Fe, Co, Ni, B, Al and Si.

11. The method of claim 1 wherein X' is selected from a group consisting of halides, hydrides, alkoxides of $C_{1-6}$ and acetates.

12. The method of claim 11 wherein X' is selected from a group consisting of halides, alkoxides of $C_{1-6}$ and acetates.

13. The method of claim 1 wherein Y' is selected from a group consisting of amines, sulfides and alkyls of $C_{1-15}$.

14. The method of claim 13 wherein Y' is selected from a group consisting of amines and alkyls of $C_{1-15}$.

15. The method of claim 1 wherein $M'X'Y'_n$ is selected from a group consisting of chromium acetate, chromium nitrate, tetraethylorthosilicate, tetramethylorthosilicate, titanium tetraethoxide, aluminum isopropoxide, aluminum tri-secbutoxide, hexamethyldisilazane, di-secbutoxyaluminoxytriethoxysilane, diethylphosphatoethyltriethoxysilane, trimethylborate, chlorodimethylalkylsilane wherein alkyl is $C_{1-18}$, ammoniaborane, borane-tetrahydrofuran, dimethylsulfidedibromoborane and mixtures thereof.

16. The crystalline material modified by the method of claim 1.

17. The crystalline material modified by the method of claim 5.

18. The crystalline material modified by the method of claim 6.

19. The crystalline material modified by the method of claim 7.

20. The crystalline material modified by the method of claim 8.

* * * * *

UNITED STATES PATENT AND TRADEMARK OFFICE
CERTIFICATE OF CORRECTION

PATENT NO. : 5,145,816
DATED : September 8, 1992
INVENTOR(S) : J.S.Beck, et al

It is certified that error appears in the above-indentified patent and that said Letters Patent is hereby corrected as shown below:

| | |
|---|---|
| Abstract, line 4 | insert --IIIA-- after "IIA" |
| Abstract, line 4 | delete "VIIA" and insert --VIIIA-- |
| Abstract, line 6 | "X" should be --X'-- |
| Col. 7, line 11 | rewrite formula to read $--Si-O-R' + M'XY_n \longrightarrow SiOM'Y'_n + R'X$ |
| Col. 7, line 13 | insert --wherein-- before "Si-O-R'" |
| Col. 8, line 4 | "Y'$_n$" should be --Y'-- |
| Col. 28, claim 8, line 7 | delete --,-- |

Signed and Sealed this

Third Day of August, 1993

MICHAEL K. KIRK

*Attest:*

*Attesting Officer*     Acting Commissioner of Patents and Trademarks